United States Patent [19]

Norzi

[11] 4,327,142

[45] Apr. 27, 1982

[54] METHOD OF MANUFACTURING GOODS OF LAMINATES AND GOODS SO MANUFACTURED

[76] Inventor: Vittorio Norzi, Via S. Carlo 131, Rho (Milan), Italy

[21] Appl. No.: 95,370

[22] Filed: Nov. 19, 1979

[30] Foreign Application Priority Data

Dec. 6, 1978 [IT] Italy .............................. 30570 A/78
Dec. 6, 1978 [IT] Italy .............................. 69791 A/78

[51] Int. Cl.³ ........................................... B32B 27/14
[52] U.S. Cl. ..................................... 428/198; 156/79; 156/276; 156/309.3; 156/62.2; 264/45.1; 264/45.4; 264/46.5; 428/201; 428/206; 428/323; 428/327; 428/537; 428/308.4; 428/313.5; 428/316.6; 427/203
[58] Field of Search ............... 428/307, 315, 310, 313, 428/198, 201, 206, 306, 323, 327, 537; 156/276, 309.3, 79; 264/45.1, 45.4

[56] References Cited

U.S. PATENT DOCUMENTS

| | | | |
|---|---|---|---|
| 3,037,897 | 6/1962 | Pelley | 264/45.4 |
| 3,076,234 | 2/1963 | Paulus | 264/45.4 |
| 3,389,195 | 6/1968 | Gianakos et al. | 264/45.4 |
| 3,896,199 | 7/1975 | Michaelis | 156/79 |

FOREIGN PATENT DOCUMENTS

468797  8/1975  U.S.S.R. .............................. 428/307

*Primary Examiner*—James J. Bell
*Attorney, Agent, or Firm*—Cushman, Darby & Cushman

[57] ABSTRACT

A method of manufacturing a goods of laminated materials which comprises the steps of wetting with a solvent one face of a first layer of a base material, of applying on to said face a second layer of pre-expanded pellets of a plastic, and of injecting and expanding directly on said second layer a third layer of a plastic.

9 Claims, 12 Drawing Figures

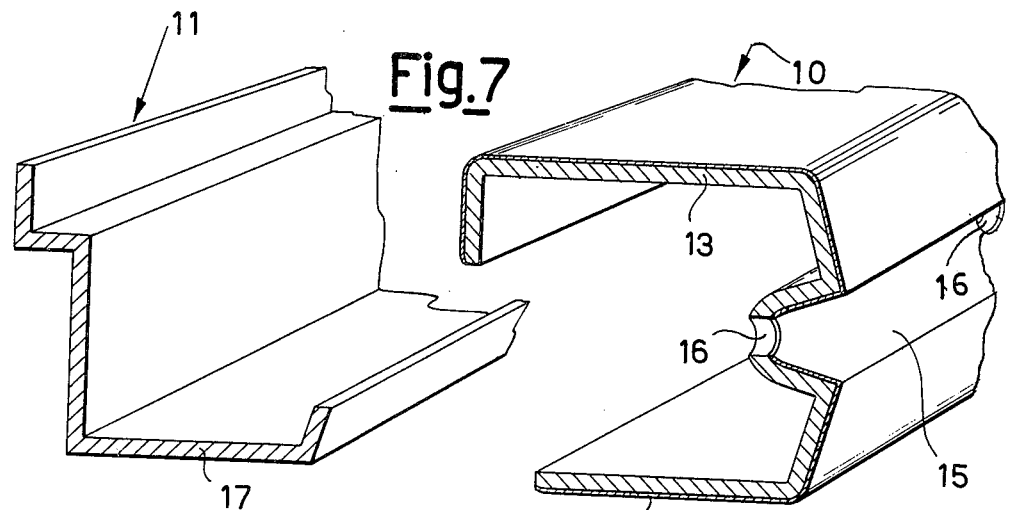
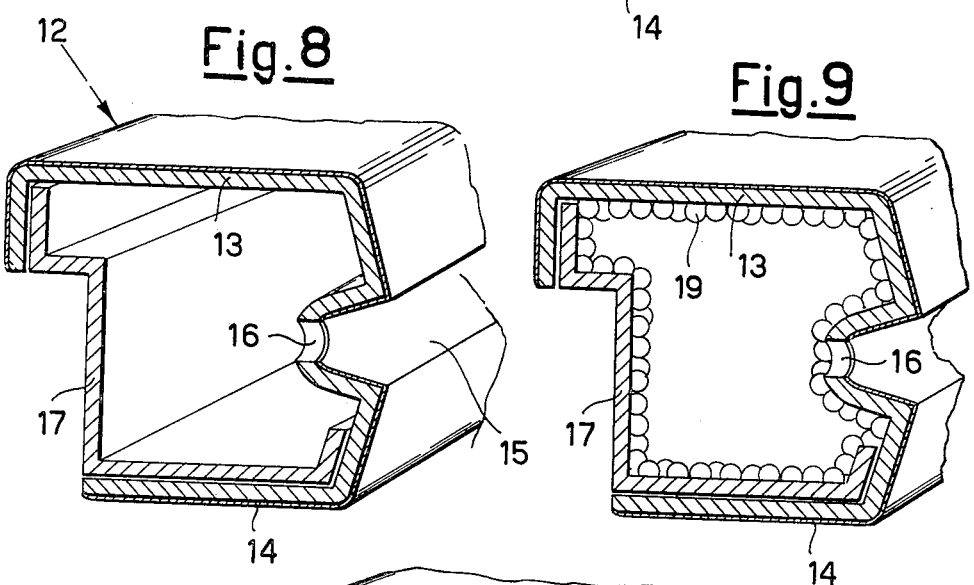
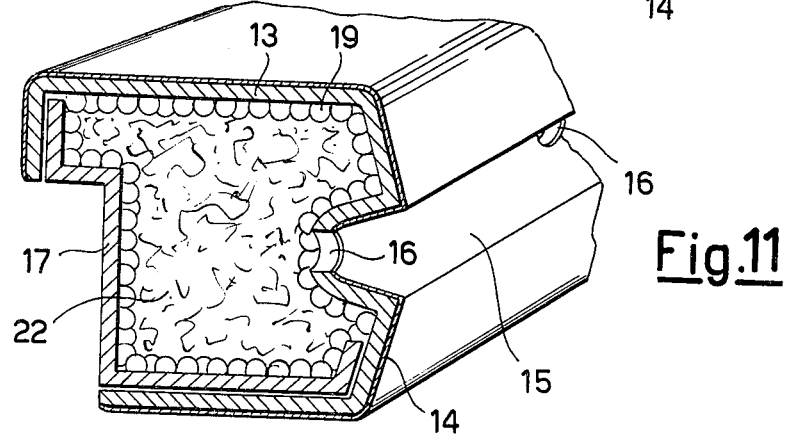

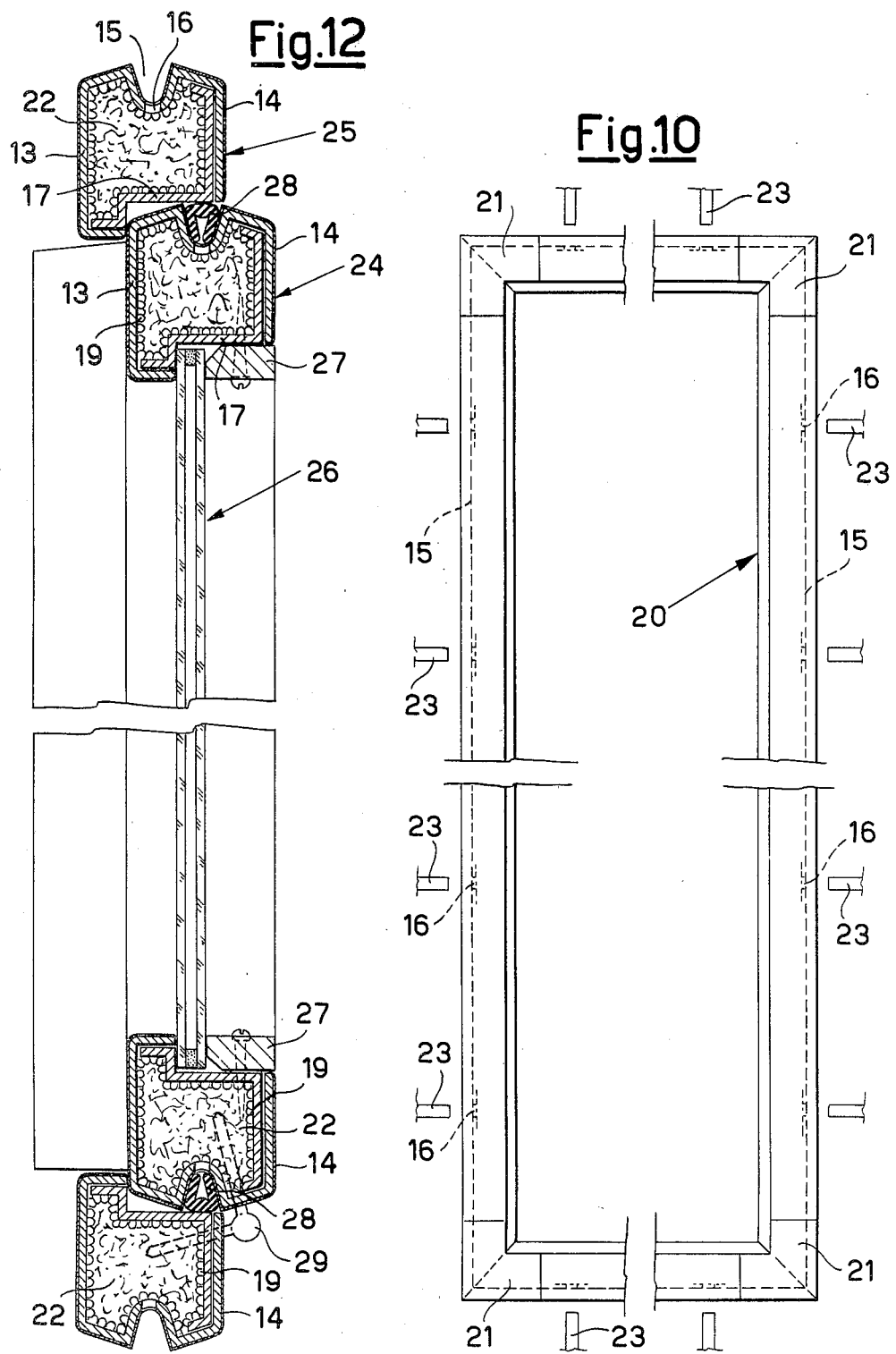

METHOD OF MANUFACTURING GOODS OF LAMINATES AND GOODS SO MANUFACTURED

The present invention relates to a method for manufacturing goods such as as panels and profiles of laminated materials, be it with plane surfaces, be it with surfaces variously profiled, and destined to the most varied uses in the field of building constructions, as well as in the field of the decoration of interiors. The invention relates also to goods manufactured by said method.

It is an object of the present invention to provide a method by means of which it may be possible to manufacture laminated goods (also called "laminates") from extremely cheap materials, and having suitable physical and mechanical characteristics.

In that way they can serve as valid substitutes for much more costly goods, by coupling sheets of metal and of wood, of metal and plastic, of plastic and wood, or even produced entirely of wood or of plastic.

This object is attained according to the invention by a method of manufacture of a panel of laminated materials characterized in that it comprises the following steps:

(a) wetting with a solvent one face of one first layer of a base material;
(b) applying on said face a second layer of pre-expanded pellets of a plastic; and
(c) injecting and expanding directly upon said second layer, a third layer of a plastic.

On the exposed face of said first layer there may be applied a sheet of a decorative material.

Moreover, if it is wished to obtain a particularly sturdy and stable panel, in the third layer there may be embedded a reinforcement.

By way of example without limitation there is hereinafter described the application of the method of the invention also to the manufacture of a window or window-door or the like.

As is well-known by the skilled in the art in this particular field of technics, there are available in the trade windows, window-doors and doors of metal, of wood and of plastic.

The frame and the counter-frame of a window or door of wood are obtained by working by machine tool a block, in such a way as to obtain the desired profile. The profile may be joined with others to form the frame or the counter-frame of rectangular shape of the window or door, which then will be painted.

The frame and the counter-frame of a window or door of metal are obtained by assembling hollow metal profiles, which may be already anodized or zinked, or even painted after assembling.

The frame and the counter-frame of a window or door of plastic are obtained in an analogous way by assembling hollow extruded profiles.

Hence it appears evident how the frame and counter-frame of a window or door are to meet precise requirements of sturdiness and external appearance.

It is the effort of all manufacturers of windows and doors to meet the said requirements at the least cost possible.

However, the results obtained have not been guite satisfactory so far owing to the higher and higher incidence of the cost of labour and owing to the growing cost of the raw material employed.

It is an object of the present invention to provide a method of manufacturing a window or door, or a window-door or the like, that can be applied automatically with minimum use of labour while utilizing materials extremely cheap and obtaining nevertheless a very sturdy and of aesthetic appearance.

To that end, according to the present invention, the idea has been to provide a method of manufacturing a window or door, or a window-door or the like, which method is characterized in that it comprises the following steps:

(a) making two semi-shells (10, 11) which together form the profile of the frame or of the counter-frame of the window or door, by means of moulding the respective panels (13, 17) of wood fibre of the desired length, on one face of at least one of which there is applied a sheet (14) of a decorative material, the semi-shell (10) with the decorative sheet (14) comprising the exposed walls of the frame of the window or door, whilst the other semi-shell (11) comprises the non-exposed walls of the frame and walls destined to be superimposed internally to corresponding walls of the semi-shell (10);

(b) wetting the internal surfaces of the profile (12) with a solvent;

(c) applying to said solvent-wetted surfaces a superficial layer of pellets of a pre-expanded plastic;

(d) coupling the two semi-shells (10, 11) so as to form a profile (12) having the complete shape of the frame or counter-frame of the window or door;

(e) assembling four profiles (12) obtained as described hereinabove in the shape of a frame or counter-frame of a window or door; and (f) injecting and expanding inside said frame or counter-frame an injectable and expansible plastic.

Preferably, the semi-shell (10) is moulded with a channel (15) suited to receive a sealing gasket (28) in a position opposed to the conventional rabbet present in a frame or counter-frame of a window or door, in said channel (15) there being further provided a set of holes (16) for the injection of the material.

Preferably, the said pre-expanded pellets and said plastic injected and expanded inside the frame or counter-frame comprise polystyrene.

In successive operations, to the frame there is applied a pane, the hinges, the lock with handle, the perimetral fittings, whence one obtains a wing of window or door that is mounted on a counter-frame which too is provided with hinges and perimetral fittings.

The features of the method of the invention will appear more fully clear by perusing the following description with reference to the accompanying drawings, in which:

FIG. 7 is an exploded view of the section of the two base profiles that serve to put to practice the method of the invention in manufacturing a window or door;

FIG. 8 is a section showing the two profiles of FIG. 7 in assembled condition;

FIGS. 9 to 11 show the steps of preparation and assembling of the frame of the window or door; and FIG. 12 is a horizontal section showing an example of window made according to the invention.

Figure 1:
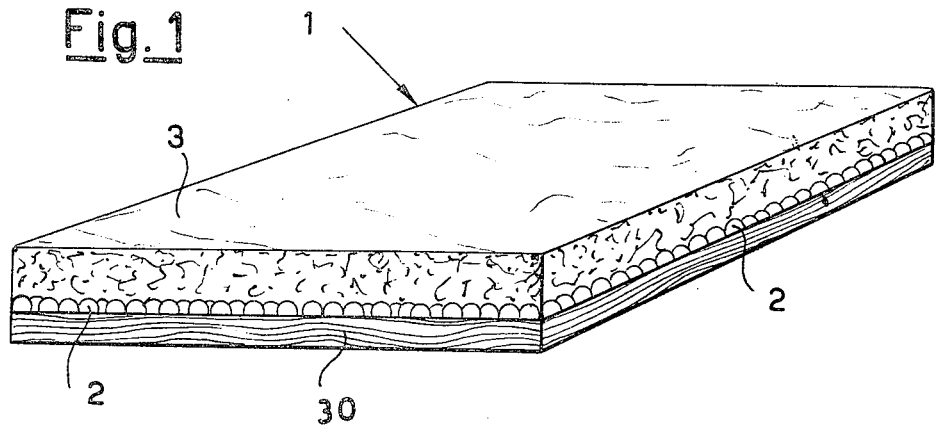
FIGS. 1 to 6 show examples of laminated panels obtainable by the method of the present invention.

In FIG. 1 there is shown a panel 1 comprising a base layer 30 of a wood fibre, for instance the kind known in the trade with the name of MASONITE.

In accordance with the principle of the present invention, one face of the aforesaid layer 30 is impregnated with a solvent on which there is spread a layer 2 of pre-expanded pellets of plastic, for instance polystyrene; in that way the pellets 2 intimately stick to the layer 30 thanks to the action of the solvent that dissolves them in part so as to glue them to said layer 30, and thanks to the action of a pressing member.

By the way it should be noted that the solvent being in a position to evaporate thanks to the interstices between one pellet and the other, that permit a suitable circulation of surrounding air, dissolves only partly the said pellets which thus can provide the aforesaid layer 2 suitable to receive, by means of injection and direct expansion in the mould, a layer 3 of plastic, for instance of polystyrene, provided it be chemically compatible with the layer 2.

Figure 2:
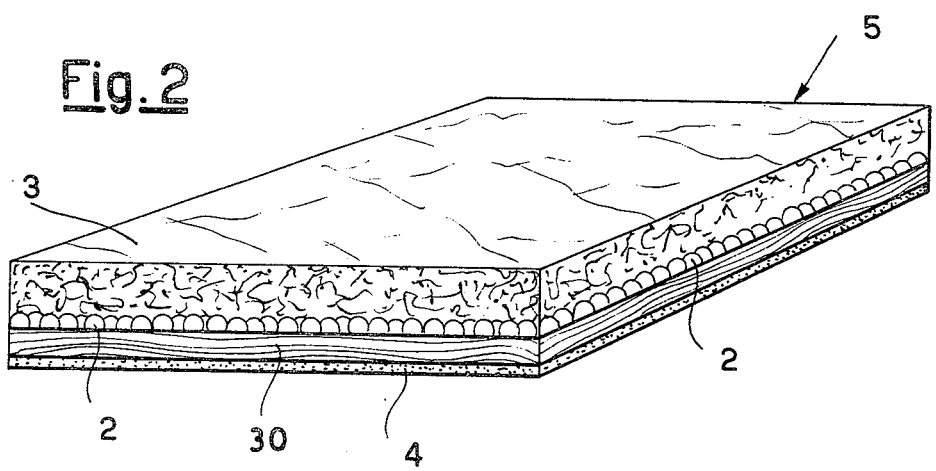

On the exposed face of the layer 30 of the panel 1 there may be applied a sheet 4 of a decorative material, for instance decorative paper or wood veneer; so the panel 5 shown in FIG. 2 is obtained.

The plane panels 1 and 5 may for instance be employed as planking panels or as pads in building construction.

Figure 3:
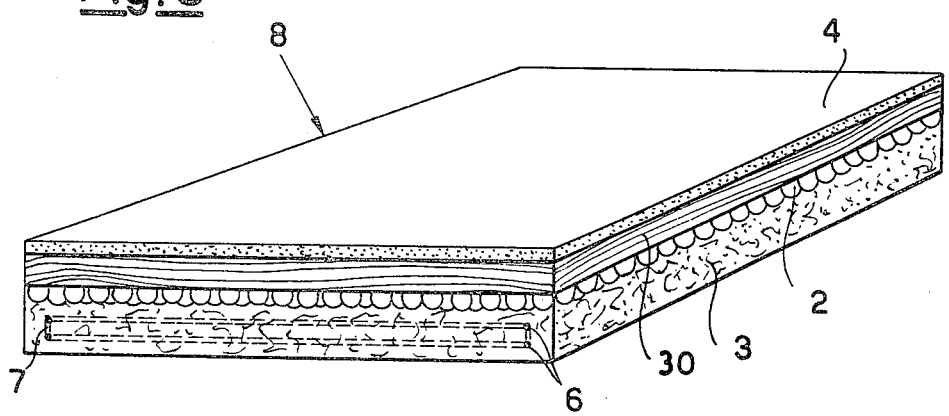

If panels of particular sturdiness and stability are required, in the layer 3 of the panel 5 of FIG. 2 there is embedded a metallic reinforcement that may be for instance composed of a couple of superimposed rings 6 interconnected by bonds 7. So the panel 8 shown in FIG. 3 is provided, which can be employed with advantage for the paving of premises.

Figure 4:
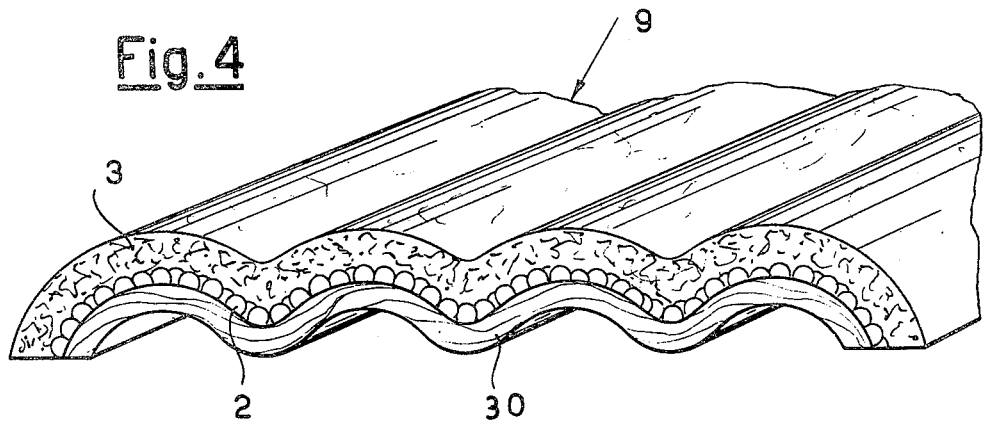

A laminated panel as hereinbefore described with reference to FIG. 1 may also have a corrugated shape; a panel of that kind is indicated by reference numeral 9 in FIG. 4 and can be used as a covering member for buildings.

Figure 5:
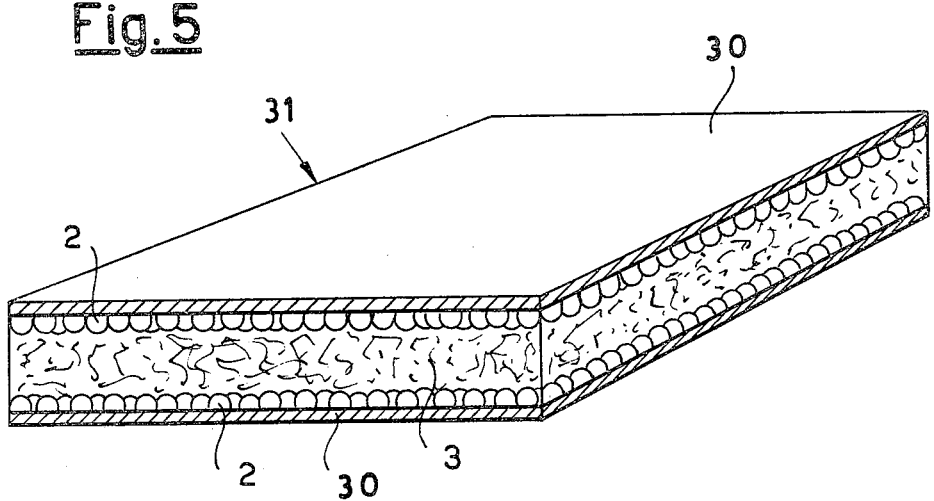
Figure 6:
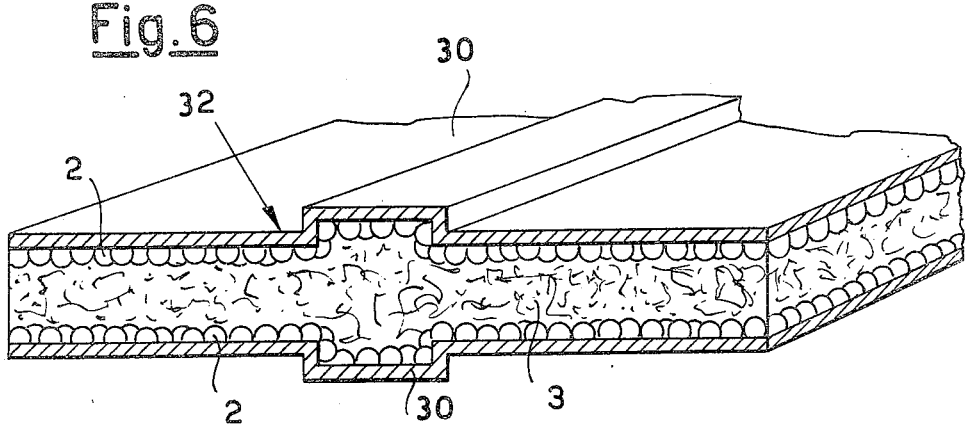

In FIGS. 5 and 6 there are shown two sandwich panels 31 and 32, respectively plane and profiled, comprising a central core composed of a layer 3 injected between two external layers 1, which may be of wood fibre or of metal.

The method of the invention therefore enables one to make panels while employing extremely cheap materials, which panels may be utilized in the most varied fields.

Now hereinafter there is described the application of the method of the invention to the manufacture of windows and doors.

With reference to FIG. 7 of the drawings, with 10 and 11 are respectively indicated two semi-shells which if assembled provide the profile 12 of FIG. 8 that is used for the manufacture of the window or door according to the invention.

The semi-shell 10 is made starting from a plane panel 13 of wood fibre, e.g. from the kind known in the trade by the name of MASONITE, which is firstly dipped into hot water and is then pressed, while still hot, in the mould of FIG. 7. Before hot moulding, on one face of the panel 13 there is applied a sheet 14 of a decorative material impregnated with an adhesive based on thermosetting resins, which exerts its glueing action through the application of heat during the moulding step. The decorative sheet 14 may be e.g. a decorative paper, or a wood veneer; the adhesive may be e.g. a melaminic resin or a urea resin.

The semi-shell 10 is moulded in the mould comprising the walls of the window or door that are to be exposed. In practice, all of the walls, excepted those that will be covered by the pane (glass) and by the respective pane holder. Moreover, in one wall of the semi-shell 10 there is provided a channel 15 destined to receive a sealing gasket, or packing, in which channel there is provided a set of holes 16, the purpose of which will be made clear later on.

In a manner analogous to the semi-shell 10, the semi-shell 11 is made by hot moulding of a panel 17 of wood fibre which too is previously wetted in hot water, but which may even not be refined by the application of a covering sheet. The profile of the semi-shell 11 in fact comprises the walls not exposed of the frame of the window or door and walls destined to be superimposed intarnally to the corresponding walls of the semi-shell 10. In the embodiment of a counter-frame, instead, also the semi-shell 11 is refined.

The semi-shells 10 and 11, moulded separately, are first sprayed on the internal surfaces with a solvent, and on the same surfaces there is then deposited a layer 19 of pre-expanded pellets. Consequently, a superficial layer 19 of pellets of pre-expanded polystyrene (FIG. 9) remains intimately stuck to the internal surfaces of the profile 12 owing to the action of the solvent that dissovles them partly so as to glue them to said profile.

By the way it should be noted in this respect that the solvent, since it can evaporate, owing to the interstices between a pellet and the other and owing to the big air chamber inside the profile, dissolves only partly the said pellets, which so may provide the aforesaid layer 19 suited to receive a filler of expanded polystyrene injected directly, as will be successively explained.

The semi-shells 10 and 11 moulded separately in the desired length are assembled as shown in FIG. 8 of the drawings, so as to provide the profile 12 having a complete shape of a frame (or counter-frame) of a window or door. The assembling is carried out by mutual fitting into each other of the semi-shells, which may be axial or lateral; in this latter case the coupling is made possible by utilizing the relative elasticity of the semi-shells, whence the semi-shell 11 can be introduced through the open zone of the semi-shell 10. Prior to coupling, the surfaces of the two semi-shells destined to come to mutual contact, are spread with adhesive.

The profile 12, therefore, appears already externally finished in the walls that will become exposed and requires only a possible operation of cementing at the free borders superimposed of the two semi-shells.

Four profiles 12 moulded and prepared as above described, in the desired dimensions, are assembled as shown in FIG. 10 in such a manner as to provide a frame (or counter-frame) 20 of a window or door. The assembling may for instance be carried out by means of small angle plates 21 inserted and glued within the ends of the profiles. The small angle plates 21 may be of massive wood, or they may comprise a metal core coated with expanded material having high density, or they may be of any other suitable kind.

The frame so obtained is filled with expanded polystyrene 22 (FIG. 11) injected by means of nozzles diagrammatically represented at 23 (FIG. 10) which are introduced through the holes 16 pre-arranged in the semi-shell 10. The injected polystyrene is expanded and bonded intimately with the superficial layer 19, chemically compatible, previously prepared to receive it.

It should be further noted that the polystyrene injected under pressure compresses the walls of the semi-shell 11 against that of the semi-shell 10, which walls are glued strongly to each other, whence the profile 12 behaves like a monolithic structure.

In addition there is attained a stable and durable bond between the polystyrene and the wood fibre, not obtainable by injecting the polystyrene directly onto the internal surfaces of the profile spread with solvent. In fact, the direct injection of the polystyrene onto the solvent would not permit the latter to evaporate with sufficient rapidity, whence the said solvent has time to corrode irreparably specially the superficial layers of the polystyrene, preventing it so from sticking to the internal surfaces of the profile of wood fibre and from exerting its task as a member for stiffening the walls of said profile.

In FIG. 12 of the drawings, which shows by way of example without limitation a finished window or door made by the method according to the invention, the frame is indicated by 24 and the counter-frame by 25.

To the frame there is applied a pane 26 by means of a usual pane holder 27 and resiliently yielding sealing gaskets or packings 28 are glued within the channels 15 so as to obtain a window wing or a door wing.

The hinges 29 of the window or door and the lock (not shown for the sake of simplicity of the drawing) are advantageously applied at the superimposed walls of the semi-shells 10, 11, conveniently pre-arranged also for that purpose, which have a suitable thickness.

In this way is attained the purpose mentioned in the introductory part of this specification, namely to provide a method by means of which it be possible to make an article with a minimum employment of labour and utilizing extremely cheap materials, such as wood fibre and expanded polystyrene, extremely low cost as compared with the materials conventionally used. At the same time there is obtained an article having suitable physical and mechanical characteristics.

I claim:

1. A method of manufacturing a goods of laminated materials characterized in that it comprises the following steps:
   (a) wetting with a solvent one face of a first layer of a base material;
   (b) applying onto said face a second layer of pre-expanded pellets of a plastic; and
   (c) injecting and expanding directly on said second layer a third layer of plastic.

2. A method of manufacturing goods of laminated materials comprising: applying to one face of a first layer of a base material a sheet of decorative material; wetting with a solvent the opposite face of said first layer; thereafter applying onto said wetted face a second layer of pre-expanded pellets of a plastic; and thereafter injecting and expanding directly on said second layer a third layer of plastic.

3. A method of manufacturing goods of laminated materials comprising: wetting with a solvent one face of a first layer of a base material; applying onto said face a second layer of pre-expanded pellets of a plastic; and injecting and expanding directly on said second layer a third layer of plastic in which there is embedded a reinforcement.

4. A method of manufacturing goods of laminated materials comprising wetting with a solvent one face of each of two layers of a base material; applying onto each wetted face a second layer of pre-expanded pellets of a plastic; and injecting and expanding a third layer of plastic directly on and between said second layers.

5. A laminated article manufactured by the method of claim 1.

6. A laminated article manufactured by the method of claim 2.

7. A laminated article manufactured by the method of claim 3.

8. A laminated article manufactured by the method of claim 4.

9. In a method of manufacturing a laminated construction panel by injecting and expanding a plastic material onto a face of a base layer in a mold, the improvement which comprises improving the bond obtained between the base layer and the injected, expanded layer by wetting said face of said base layer, before the injection and expansion step, with a liquid volatile solvent, applying onto said wetted face a layer of pre-expanded pellets of a plastic thereby partially dissolving the pellets so as to cause them to stick to said base layer, evaporating the solvent through the interstices between the pellets and thereafter carrying out the injecting and expanding of said plastic material on the layer of pre-expanded beads, said plastic material being compatible with said beads thereby achieving a stable and durable bond between the injected and expanded plastic material and said base layer.

* * * * *